United States Patent
Herszenhaut et al.

(10) Patent No.: US 12,164,312 B2
(45) Date of Patent: Dec. 10, 2024

(54) DETECTING STALLED STATE OF DYNAMIC POOL EQUIPMENT

(71) Applicant: Maytronics Ltd., Kibbutz Yizrael (IL)

(72) Inventors: Leo Herszenhaut, Haifa (IL); Gilad Goldenberg, Kfar-Saba (IL)

(73) Assignee: Maytronics Ltd., Kibbutz Yizrael (IL)

( * ) Notice: Subject to any disclaimer, the term of this patent is extended or adjusted under 35 U.S.C. 154(b) by 0 days.

(21) Appl. No.: 18/631,135

(22) Filed: Apr. 10, 2024

(65) Prior Publication Data

US 2024/0345604 A1    Oct. 17, 2024

(30) Foreign Application Priority Data

Apr. 11, 2023  (IL) .......................................... 302052

(51) Int. Cl.
  *G05D 1/86* (2024.01)
  *G05D 101/15* (2024.01)
  (Continued)

(52) U.S. Cl.
  CPC .......... *G05D 1/86* (2024.01); *G05D 2101/15* (2024.01); *G05D 2105/10* (2024.01); *G05D 2109/38* (2024.01)

(58) Field of Classification Search
  CPC .......... E04H 4/1654; E04H 4/00; E04H 4/12; E04H 4/1209; E04H 4/1281; E04H 4/16;
  (Continued)

(56) References Cited

U.S. PATENT DOCUMENTS

| 2007/0067930 A1 | 3/2007 | Garti | |
| 2011/0212717 A1* | 9/2011 | Rhoads | G06F 16/9537 455/418 |

(Continued)

FOREIGN PATENT DOCUMENTS

| AU | 2016257063 B2 * | 8/2020 | ........... E04H 4/1654 |
| CA | 3188675 A1 * | 4/2024 | ............. G06N 20/00 |

(Continued)

OTHER PUBLICATIONS

Search Report Dated Nov. 21, 2023 From the Israel Patent Office Re. Application No. 302052. (3 Pages).

(Continued)

*Primary Examiner* — Jeffrey P Aiello

(57) ABSTRACT

Disclosed herein is a method of detecting stalled state of a dynamic pool equipment unit, comprising receiving a plurality of movement features relating to a dynamic pool equipment unit deployed in a water pool which are captured during a predefined sampling window and comprise (1) motion features of the pool equipment unit, and (2) operational features of electric motor(s) of the pool equipment unit, determining a movement pattern of the pool equipment unit using one or more statistical models applied to the plurality of movement features which are trained to estimate a stalled state of the pool equipment unit in which the pool equipment unit is pitched up and unable to advance on a slopped obstacle in the water pool, and causing the pool equipment unit to stop attempted advance in a current direction responsive to determining that the pool equipment unit is in the stalled state.

18 Claims, 3 Drawing Sheets

(51) Int. Cl.
*G05D 105/10* (2024.01)
*G05D 109/30* (2024.01)

(58) Field of Classification Search
CPC ..... E04H 4/1272; B08B 2203/00; B08B 1/00; A47L 2201/00; G06N 20/00; G01P 15/00; G05B 2219/35001; G06F 1/00
USPC ...... 15/1.7, 319; 700/275; 702/183, 188, 19, 702/22, 150, 141, 184, 152, 1, 104, 95; 901/1
See application file for complete search history.

(56) References Cited

U.S. PATENT DOCUMENTS

| | | | |
|---|---|---|---|
| 2014/0080428 A1* | 3/2014 | Rhoads | H04W 4/70 455/88 |
| 2018/0135325 A1 | 5/2018 | Schloss et al. | |
| 2018/0181144 A1* | 6/2018 | Steinmann | G06Q 40/08 |
| 2019/0243379 A1 | 8/2019 | Attar et al. | |

FOREIGN PATENT DOCUMENTS

| | | | |
|---|---|---|---|
| CN | 115690913 A * | 2/2023 | |
| EP | 1277897 A1 * | 1/2003 | ........... E04H 4/1654 |
| EP | 1277897 | 12/2007 | |

OTHER PUBLICATIONS

Examination Report Dated Jun. 16, 20024 From the Australian Government, IP Australia Re. Application No. 2024202296. (5 Pages).

Supplementary European Search Report and the European Search Opinion Dated Sep. 27, 2024 From the European Patent Office Re. Application No. 24169445.4. (5 Pages).

* cited by examiner

DETECTING STALLED STATE OF DYNAMIC POOL EQUIPMENT

RELATED APPLICATION(S)

This application claims the benefit of priority of Israel Patent Application No. 302052 filed on Apr. 11, 2023, the contents of which are incorporated by reference as if fully set forth herein in their entirety.

BACKGROUND

The present invention, in some embodiments thereof, relates to detecting a stalled state of dynamic pool equipment units, and, more specifically, but not exclusively, to using trained statistical models for detecting a stalled state of dynamic pool equipment units in which the unit continuously attempts to advance but is unable to due to some external interference.

Automated pool equipment units, systems, platforms and/or devices are widely used to carry out one or more tasks and/or operations, for example, cleaning, water purification, maintenance, and/or the like in bodies of water, specifically in artificial bodies of water such as, for example, swimming pools, reservoirs, fountains, and/or the like.

The automated pool equipment may often comprise mobile dynamic units, for example, a pool robot, a pool cleaning robot, a pool maintenance robot, a water treatment system, and/or the like which may dynamically move in the water pool, for example, on its floor surface, walls, and/or the like to execute their assigned tasks.

SUMMARY

According to a first aspect of the present invention there is provided a computer implemented method of detecting stalled state of a dynamic pool equipment unit, comprising using one or more processors for:

Receiving a plurality of movement features relating to a dynamic pool equipment unit deployed in a water pool. The plurality of movement features, captured during a predefined sampling window, comprise one or more motion features of the pool equipment unit and one or more operational features of one or more electric motors of the pool equipment unit.

Determining a movement pattern of the pool equipment unit using one or more statistical models applied to the plurality of movement features. The one or more statistical models is trained to estimate a stalled state of the pool equipment unit in which the pool equipment unit is pitched up and unable to advance on a slopped obstacle in the water pool.

Causing the pool equipment unit to stop attempted advance in a current direction responsive to determining that the pool equipment unit is in the stalled state.

According to a second aspect of the present invention there is provided a system for detecting stalled state of a dynamic pool equipment unit, comprising a program store storing a code; and one or more processors coupled to the program store. One or more of the processors are configured to execute the code. The code comprising:

Code instructions to receive a plurality of movement features relating to a dynamic pool equipment unit deployed in a water pool. The plurality of movement features, captured during a predefined sampling window, comprise one or more motion features of the pool equipment unit and one or more operational features of one or more electric motors of the pool equipment unit.

Code instructions to determine a movement pattern of the pool equipment unit using one or more statistical models applied to the plurality of movement features. The one or more statistical models are trained to estimate a stalled state of the pool equipment unit in which the pool equipment unit is pitched up and unable to advance on a slopped obstacle in the water pool.

Code instructions to cause the pool equipment unit to stop attempted advance in a current direction responsive to determining that the pool equipment unit is in the stalled state.

In a further implementation form of the first, and/or second aspects, the stalled state is determined based on a comparison between an estimation score computed by the one or more statistical models for the estimated stalled state and a certain threshold.

In a further implementation form of the first, and/or second aspects, the one or more statistical models are trained to classify the movement pattern of the pool equipment unit to normal movement and to the stalled state based on the plurality of movement features.

In an optional implementation form of the first, and/or second aspects, it is determined that the pool equipment unit is in the stalled state based on aggregation of a plurality of estimations computed by the one or more statistical models based on a plurality of movement samples sets captured during a plurality of consecutive sampling windows.

In an optional implementation form of the first, and/or second aspects, it is determined that the pool equipment unit is in the stalled state responsive to detecting the stalled state exceeds a predefine time period.

In an optional implementation form of the first, and/or second aspects, the pool equipment unit is permitted to persist in the stall state without stopping it.

In an optional implementation form of the first, and/or second aspects, one or more first statistical models are trained to estimate the stalled state during forward movement and one or more second statistical models are trained to estimate the stalled state during backward movement.

In a further implementation form of the first, and/or second aspects, the one or more statistical models are trained in one or more supervised learning training sessions using a plurality of labeled training samples. Each of the plurality of labeled training samples comprises one or more of the plurality of movement features and is associated with a label indicative of movement of the pool equipment unit at a time of capturing the one or more movement features of the respective training sample.

In a further implementation form of the first, and/or second aspects, one or more of the statistical models are based on linear discriminant analysis (LDA).

In a further implementation form of the first, and/or second aspects, one or more of the statistical models comprise one or more machine learning (ML) models.

In a further implementation form of the first, and/or second aspects, each of the one or more motion features is selected from a group consisting of: an acceleration, an angular velocity, a velocity, and/or an orientation.

In a further implementation form of the first, and/or second aspects, the one or more motion features are captured by one or more sensors deployed to measure motion parameters of the pool equipment unit.

In a further implementation form of the first, and/or second aspects, each of the one or more operational features is selected from a group consisting of: a Pulse Width Modulation (PWM), a current, a voltage, and/or a power driven to one or more of the electric motors.

In a further implementation form of the first, and/or second aspects, one or more of the operational features are measured by one or more sensors deployed to measure operational parameters of one or more of the electric motors.

In a further implementation form of the first, and/or second aspects, one or more of the operational features are reported by one or more controllers of one or more of the electric motors.

In an optional implementation form of the first, and/or second aspects, one or more actions are initiated responsive to determining the pool equipment unit is in the stalled state, the one or more actions comprising, inducing movement of the pool equipment unit is a different direction, and/or transmitting one or more warning messages to one or more remote devices.

In a further implementation form of the first, and/or second aspects, one or more of the electric motors operate advancing means of the pool equipment unit configured to advance the pool equipment unit.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
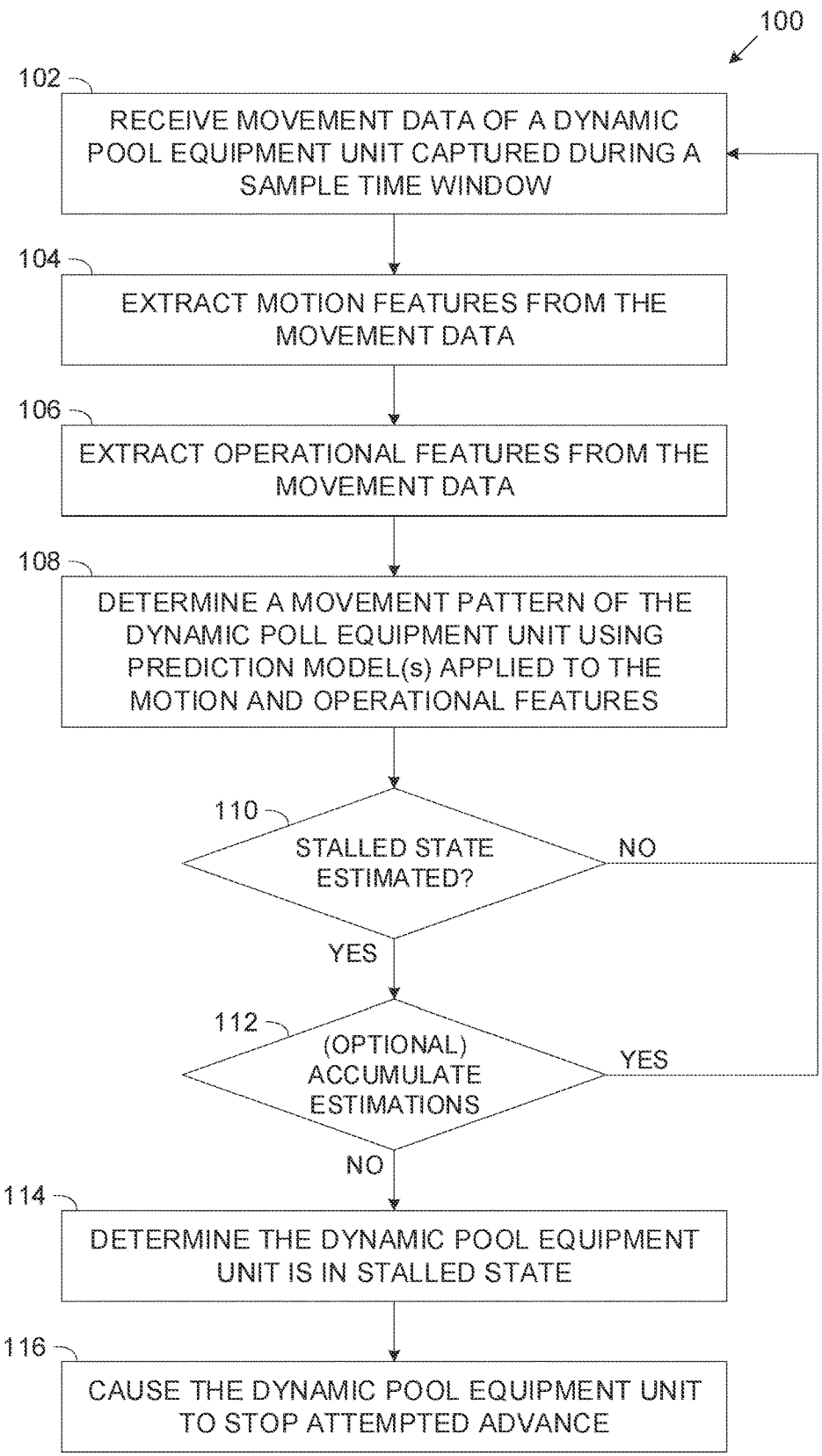
FIG. 1 is a flowchart of an exemplary process of detecting a stalled state of a dynamic pool equipment unit deployed in a water pool, according to some embodiments of the present invention.

The present invention, in some embodiments thereof, relates to detecting a stalled state of dynamic (mobile) pool equipment units, and, more specifically, but not exclusively, to using trained statistical models for detecting a stalled state of dynamic pool equipment units in which the unit continuously attempts to advance but is unable to due to some external interference.

Dynamic pool equipment for example, a pool robot, a pool cleaning robot, a pool maintenance robot, a water treatment system, and/or the like may be deployed in bodies of water, specifically manmade (artificial) bodies of water such as, for example, a pool, a swimming pool, a water reservoir, a fountain and/or the like in order to carry out one or more tasks and/or operations in the water pool, for example, cleaning, purification, maintenance, and/or the like.

Such mobile dynamic pool equipment units which dynamically move in the water pool may often enter a stalled state, which refers herein after to a state, in which the dynamic pool equipment unit is pitched up and unable to advance in a current direction on a slopped obstacle in the water pool due to one or more external interferences. Such external interferences may comprise and/or be induced by, for example, a wall, a slopped blocking object, slipperiness of the surface, and/or the like.

In the stalled state, the stuck pool equipment unit may keep attempting to advance in the current direction through operation of its motor(s) regardless of its inability to move. This state may be also known as "digging" meaning that the pool equipment unit may push and "dig" into the obstructing object without really advancing.

The term advance as used herein may relate to movement in the current direction which may be forward, backward, sideway, and/or any direction in which the dynamic pool equipment unit is normally capable of moving in when not blocked or stalled.

According to some embodiments of the present invention, there are provided methods, systems and computer program products for detecting stalled state of dynamic pool equipment units deployed in one or more bodies of water collectively designated water pool herein after.

Detection of movement patterns of the pool equipment unit in the water pool and specifically detection of the stalled state is done based on analysis of movement features relating and/or indicative of movement of the pool equipment unit in the water pool which are extracted from movement data of the pool equipment unit.

Specifically, detection of the movement patterns of the pool equipment unit including the stalled state may be done using one or more trained statistical models employing one or more statistical methods, for example, Linear Discriminant Analysis (LDA), Analysis of variance (ANOVA), regression analysis, and/or the like applied to the movement features.

Optionally, the statistical model(s) may comprise one or more Machine Learning (ML) models, for example, a neural network, a Support Vector Machine (SVM), a classifier, and/or the like trained to classify movement patterns of the pool equipment unit based on the movement features.

The movement features may comprise one or more motion parameters indicative of movement of the pool equipment unit and/or one or more operational features indicative of operation of one or more motors of the pool equipment unit collected during one or more sampling windows (intervals), for example, 0.5 seconds, 1 second, 2 seconds, 3 seconds, 5 seconds, and/or the like.

The motion features, interchangeably designated motion parameters, which are indicative of movement and/or motion attributes and/or characteristics may comprise, for example, angular velocity, acceleration, velocity, orientation, heading angle, elevation, and/or the like. The operational features, interchangeably designated operational parameters, which are indicative of the operation of the electric motor(s) operated to advance the pool equipment unit may include, for example, current, voltage, Pulse Width Modulation (PWM), Revolutions Per Minute (RPM), and/or the like.

The movement features, i.e., the motion features and/or the operational features may be extracted, computed and/or derived from movement data captured, measured, reported, and/or otherwise obtained by one or more sensors, devices, units and/or the like deployed in the pool equipment unit to monitor movement parameters, for example, a gyroscope, a magnetometer, an Inertial Measurement Unit (IMU), a Hall effect sensor, current sensor, a voltage sensor, and/or the like. Optionally, the movement data and/or part thereof may be reported and/or received from one or more controllers of the pool equipment unit controlling operation of its electric motor(s).

The statistical model(s) may be adapted and trained to predict and classify accordingly movement patterns of the pool equipment unit based on values of the movement features, i.e., the motion features and/or the operational features and/or their relations with each other. The statistical model(s) may be adapted and trained to classify the movement pattern of the pool equipment unit to multiple classes, for example, two classes, namely a normal movement and the stalled state.

The statistical model(s) may be trained in one or more supervised learning training sessions using a plurality of labeled training samples. Each training sample may comprise (values of) one or more of the movement features captured for a certain dynamic pool equipment unit such as the pool equipment unit and may be labeled accordingly to indicate the movement pattern of the respective pool equipment unit at the time of capturing the movement features.

The labeled training samples may include a plurality of training samples reflecting normal movement patterns of one or more pool equipment units such as the pool equipment unit, for example, forward movement, backward movement, upward movement, sideways movement, rotation, and/or the like. The labeled training samples may further include a plurality of training samples reflecting the stalled state, i.e., training samples captured while the one or more pool equipment units are in the stalled state. Each of the training samples may be labeled accordingly to indicate whether the respective training sample reflects the stalled state or normal movement.

Optionally, the statistical models may comprise one or more first statistical models specifically adapted and trained accordingly to estimate and/or predict the stalled state movement pattern during forward movement and one or more second statistical models adapted and trained accordingly to estimate, and/or predict the stalled state movement pattern during backward movement.

Optionally, the movement pattern of the pool equipment unit, specifically the stalled state is determined based on aggregation, for example, sum, average, normalization, and/or the like of a plurality of estimations computed by the statistical model(s) based on a plurality of movement samples sets captured during a plurality of consecutive sampling windows.

Optionally, the movement pattern of the pool equipment unit, specifically the stalled state is determined responsive to detecting that the stalled state exceeds a predefine time period (timeout), for example, 3 seconds, 4 seconds, 5 seconds, 10 seconds, and/or the like. This may be done, for example, by aggregating a plurality of estimations of the stalled state which are based on movement data samples captured in a plurality of consecutive sampling windows exceeding the desired timeout period. In another example, this may be achieved by adjusting the sampling window to the desired timeout period.

Responsive to determining that the dynamic pool equipment unit is in the stalled state the pool equipment unit may be operated to stop attempting to advance in the current direction, i.e., stop "digging".

Using statistical models to detecting and determine stalled state of dynamic pool equipment units may present significant benefits and advantages compared to existing stall detection methods and systems.

Most if not all stall detection methods employ a timeout mechanism in which in case the pool equipment unit is not moving, while it should, for a predefined time period (timeout), typically, an extended time period, the pool equipment unit is instructed to change its direction and move another way. This method may present major limitations.

First, the timeout period may be significantly long, for example, 30, 60, 120 seconds and/or the like to avoid scenarios in which the dynamic pool equipment unit is only momentarily stuck and is capable of advancing given some time to overcome a possible external interface. Therefore, in case the pool equipment unit is stuck in a stalled state, the motor(s) of the pool equipment unit may operate, typically, at high power in attempt to overcome the external interface, for the duration of the timeout period. Investing major force without advancing may significantly damage one or more modules and/or components of the pool equipment unit, for example, the motor(s), advancing means, exterior parts, etc. due to excessive wear and tear. The damage to the pool equipment unit may accumulate over time which may significantly degrade operation of the pool equipment unit and potentially making it eventually unusable.

Moreover, operating the motor(s) during the timeout period may consume significant power thus significantly reduce power resources of the pool equipment unit which might be battery powered. Depleting the battery(s) of the pool equipment unit may obviously reduce its effective operational time for executing its task(s) in the water pool before it needs to be recharged. The power consumption of the pool equipment unit during the timeout period may be even further since the motor(s) may be operated at high and possibly at full power in attempt to overcome the obstacle stalling the pool equipment unit.

Furthermore, since the pool equipment unit may enter the stalled state multiple times while executing its assigned task(s) in the water pool, the timeout periods during each such stalled state may accumulate to a significant time period which may significantly prolong execution time of the tasks(s).

In contrast, determining stalled state of the pool equipment unit using the statistical model(s) may overcome these limitations since the trained statistical model(s) may quickly, accurately and effectively identify the stalled state movement pattern thus significantly reducing the time during which the pool equipment unit is in the stalled state. Specifically, the values of the movement features, i.e., motion and/or operational features, characteristic to the stalled state may be identified immediately following the time when the pool equipment unit enters the stalled state. The trained statistical model(s) analyzing these characteristic movement features and their relations, may therefore quickly infer, estimate and/or determine that the pool equipment unit is in a stalled state. Moreover, even if applying the timeout mechanism, the timeout period required for the statistical model(s) to determine that the pool equipment unit is in the stalled state is significantly reduced compared to the existing methods, typically a magnitude smaller, for example, 3 seconds compared to 30 seconds.

Since the time during which the pool equipment unit is in a stalled state during its mission it significantly reduced, the damage to the pool equipment unit due to wear and tear may be dramatically reduced, the power consumption of the pool equipment unit during stalled states may be reduced and the overall task(s) execution time may be reduced.

In addition, using two distinct statistical models for estimating stall states during forward movement and during backward movement of the pool equipment unit may further improve stalled state detection performance, for example, speed (rapidness), accuracy and/or efficiency since each of the two distinct statistical models may concentrate and specialize in detection of stalled states in specific scenarios thus increasing its detection performance.

Also, determining that the pool equipment unit is a stalled state based on aggregation of a plurality of estimations (predictions) of the statistical model(s) made based on movement features captured in multiple consecutive sampling windows may further increase performance of the stalled state detection since the aggregation may reduce and possibly eliminate, outliers and/or marginal predictions.

Finally, accurately detecting stalled state(s) of the pool equipment unit, which may be indicative of reaching and/or hitting a wall may enable calculating one or more time periods, for example, wall to wall travel time, and/or the like with improved accuracy.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of detecting a stalled state of a dynamic pool equipment unit deployed in a water pool, according to some embodiments of the present invention.

An exemplary process 100 may be executed to detecting a stalled state of a dynamic pool equipment unit deployed in a water pool in which the pool equipment unit is pitched up and unable to advance on a slopped obstacle in the water pool due to one or more external interferences, for example, a wall, a slopped blocking object, and/or the like. In such case, the pool equipment unit may keep attempting to advance regardless of its inability to move.

The stalled state may be detected based on analysis of motion features indicative of movement of the pool equipment unit and/or operational features indicative of operation of one or more motors of the pool equipment unit which may be extracted from movement data comprising movement parameters collected during one or more sampling windows.

In particular, one or more trained statistical models may be applied to the movement features and the operational features to estimate whether the dynamic pool equipment unit is in the stalled state.

Responsive to determining that the dynamic pool equipment unit is in the stalled state, for example, in case an estimation (probability) score computed by the statistical model(s) exceeds a certain threshold (classification threshold), the pool equipment unit may be operated to stop attempting to advance in the current direction.

Figure 2:
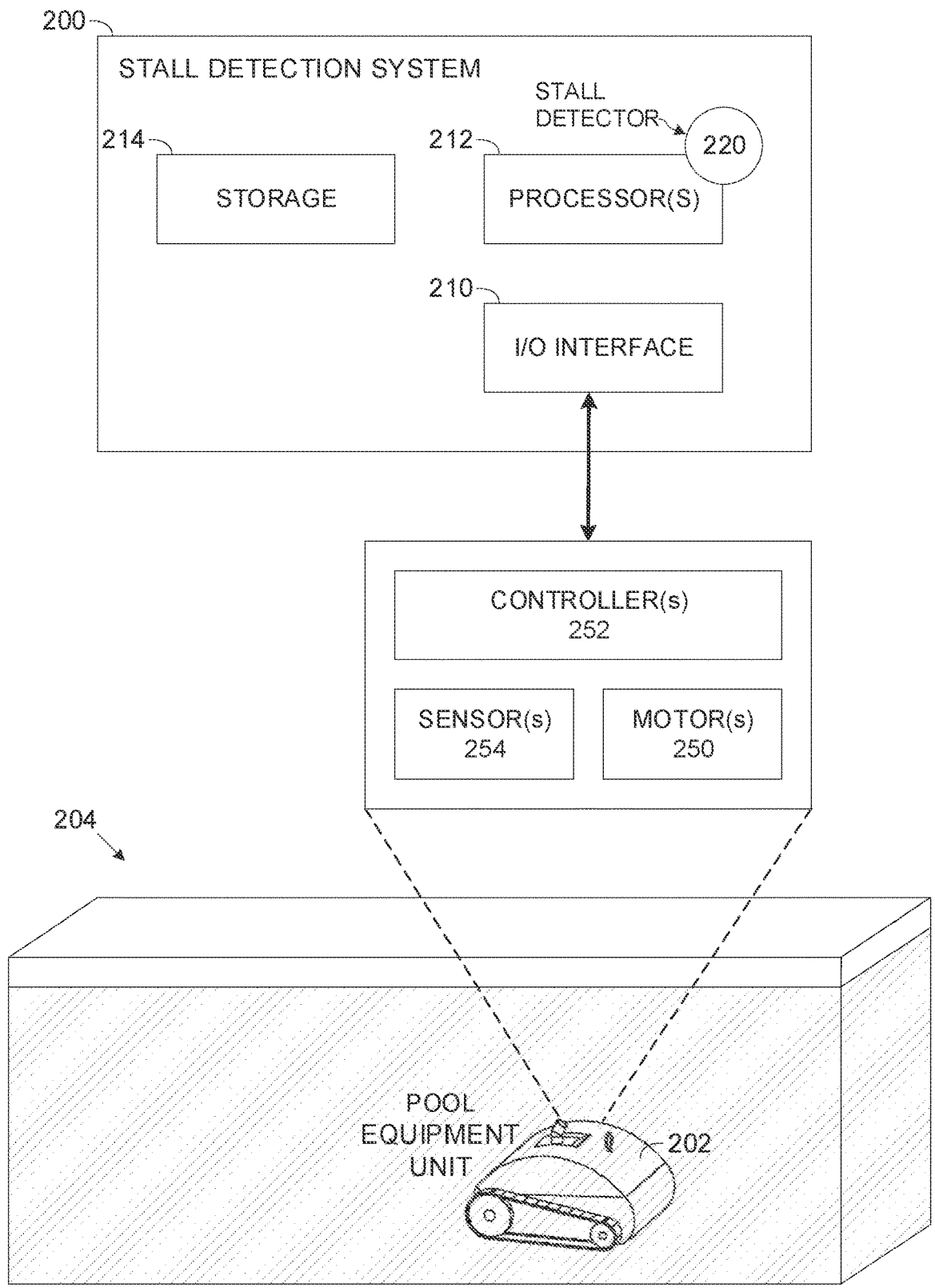
FIG. 2 is a schematic illustration of an exemplary system for detecting a stalled state of a dynamic pool equipment unit deployed in a water pool, according to some embodiments of the present invention.

Reference is also made to FIG. 2, which is a schematic illustration of an exemplary system for detecting a stalled state of a dynamic pool equipment unit deployed in a water pool, according to some embodiments of the present invention.

An exemplary stall detection system 200 may be deployed to detect a movement pattern, specifically a stalled state of a pool equipment unit 202, in particular a mobile (dynamic) pool equipment unit 202, for example, a pool robot, a pool cleaning robot, a pool maintenance robot, a water treatment system, and/or the like deployed in a body of water, specifically manmade (artificial) body of water rather such as, for example, a pool, a swimming pool, a water reservoir, a fountain and/or the like designated water pool 204 herein after.

The mobile (dynamic) pool equipment unit 202 which may dynamically move in the water pool 204 may comprise one or more electric motors 250, for example, a self-commutated motor, an external commutated motor, a synchronous motor, an asynchronous motor and/or the like controllable by one or more controllers 252 of the pool equipment unit 202.

Optionally, one or more of the electric motor(s) 250 of the pool equipment unit 202 may be servomotors which are position controlled with a feedback system as known in the art. In another example, one or more of the electric motor(s) 250 of the pool equipment unit 202 may be step motors which divides a movement range, for example, rotation into a number of equal steps. As known in the art, the electric motor(s) 250 may be operated by driving them with power, for example, voltage, current and/or the like, typically using PWM generated by one or more power supplies of the pool equipment unit 202 and/or received from an external power supply via one or more power cables connecting to the pool equipment unit 202.

The pool equipment unit 202 is equipped with advancing means, for example, wheels, tracks, a combination thereof, and/or the like coupled and operated by the electric motor(s) for moving and/or advancing the pool equipment unit 202 in one or more directions, for example, forward, backward, upward, sideways, rotation, and/or the like.

For example, the pool equipment unit 202 may comprise two or more tracks arranged at two opposite sides of the pool equipment unit 202 which may be rotated by one or more driving wheels spun by one or more of the electric motor of the pool equipment unit 202. In such case, one or more motors 250 may be operated to spin the driving wheel of both tracks to move the pool equipment unit 202 forward and/or backward, spin only one of the tracks thus causing the pool equipment unit 202 to rotate around its axis, spin the driving wheel of one of the tracks in one direction while spinning the driving wheel of the other track in the opposite direction thus causing the pool equipment unit 202 to rotate around its axis in higher speed, and/or the like.

The pool equipment unit 202 may include one or more sensors, devices, and/or units, collectively designated sensors 254 for measuring one or more parameters relating to the pool equipment unit 202, specifically movement parameters relating to movement of the pool equipment unit 202.

For example, one or more of the sensors 254 may include, a gyroscope, a magnetometer, an IMU, a Hall effect sensor, and/or the like adapted to capture and/or measure one or more motion parameters, relating to movement of the pool equipment unit 202, for example, angular velocity, acceleration, velocity, orientation, heading angle, elevation, and/or the like.

In another example, one or more of the sensors 254 may include, a current sensor, a voltage sensor, and/or the like adapted to monitor, capture and/or measure one or more operational parameters relating to one or more of the electric motors 250 inducing movement of the pool equipment unit 202 via the advancing means. The operational features may include, for example, current, voltage, PWM, RPM, and/or the like. Optionally, one or more of the operational features may be reported and/or received from one or more of the controllers 252 controlling operation of the electric motor(s) 250.

The stall detection system 200, for example, a controller, a computer, a server, and/or the like may include an Input/Output (I/O) interface 210, a processor(s) 212, and a storage 214 adapted for storing data and/or computer program code (program store).

The I/O interface 210 may include one or more wired and/or wireless I/O interfaces, ports and/or interconnections, for example, a Universal Serial Bus (USB) port, a serial port, a Bluetooth (BT) interface, a Radio Frequency (RF) interface, Wireless Local Area Network (WLAN, e.g. Wi-Fi), and/or the like. Via the I/O interface 210, the stall detection system 200 may communicate with one or more external devices. For example, via the I/O interface 210, the stall detection system 200 may connect to one or more of the sensors 254 to receive one or more of the motion features and/or the operational features. In another example, via the I/O interface 210, the stall detection system 200 may connect to one or more of the controller(s) 252 to receive one or more of the operational features. Moreover, the stall detection system 200 may communicate with the controller(s) 252, via the I/O interface 210, to receive one or more motion features and/or operational features collected by the controller(s) 252 from sensor(s) 254 communicatively coupled to the controller(s) 252.

The I/O interface 210 may optionally include one or more wired and/or wireless network interfaces for connecting to an external network comprising one or more wired and/or wireless networks, for example, a Local Area Network (LAN), a WLAN (e.g. Wi-Fi), a Wide Area Network (WAN), a Metropolitan Area Network (MAN), a cellular network, the internet and/or the like. The stall detection system 200 may communicate, over the network, with one or more remote network resources, for example, a server, a storage server, a cloud service, and/or the like.

The processor(s) 212, homogenous or heterogeneous, may include one or more processing nodes arranged for parallel processing, as clusters and/or as one or more multi core processor(s). The storage 214 may include one or more non-transitory memory devices, either persistent non-volatile devices, for example, a ROM, a Flash array, a hard drive, an SSD, and/or the like as well as one or more volatile devices, for example, a RAM device, a cache memory and/or the like.

The processor(s) 212 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the storage 214 and executed by one or more processors such as the processor(s) 212. Optionally, the processor(s) 212 may include, utilize and/or apply one or more hardware elements available in the slipperiness evaluation system 200, for example, a circuit, a component, an Integrated Circuit (IC), an ASIC, an FPGA, a Digital Signals Processor (DSP), a Graphic Processing Unit (GPU), and/or the like.

The processor(s) 212 may therefore execute one or more functional modules utilized by one or more software modules, one or more of the hardware modules and/or a combination thereof. For example, the processor(s) 212 may execute a stall detection engine, designated stall detector 220 herein after, configured to execute the process 100 for detecting a stalled state of the dynamic pool equipment unit 202. It should be noted that the steps of the process 100 executed by the stall detection system 200, specifically by the stall detector 220 may be executed by any of one or more processors of the processor(s) 212 such that any one of the processors of the processor(s) 212 may execute the process 100 and/or part thereof or optionally not participate in execution of the process 100.

As illustrated in FIG. 2, the stall detection system 200 may be separate from the controller(s) 252 operating the pool equipment unit 202. For example, the stall detection system 200 may be deployed within the pool equipment unit 202 as an at least partially independent unit which may be connected to one or more other circuits, units, modules, and/or components of the pool equipment unit 202. For example, the independent stall detection system 200 may receive power from one or more power supply circuits, units, and/or modules of the pool equipment unit 202. The independent stall detection system 200 may further communicate and exchange data, via the I/O interface 210, with one or more other components of the pool equipment unit 202, for example, the sensor(s) 254, the controller(s) 252, and/or the electric motor(s) 250.

However, in some embodiments, the stall detection system 200 may be integrated in one or more of the units, modules, and/or components of the pool equipment unit 202. For example, the stall detection system 200 may be utilized by one or more of the controller(s) 252 of the pool equipment unit 202, such that the controller(s) 252 may execute the stall detector 220.

Optionally, while non-typical, the stall detection system 200, specifically, the stall detector 220 may be utilized by one or more remote systems, for example, a server, a computing node, a cluster of computing nodes, and/or the like which are communicatively coupled to the pool equipment unit 202 via one or more networks, for example, LAN, WLAN, WAN, MAN, cellular network, the internet and/or the like, specifically high-speed networks to enable the stall detector 220 to execute the process 100 at least in near real-time.

As shown at 102, the process 100 starts with the stall detector 220 receiving movement data relating to movement of a pool equipment unit 202 deployed in a water pool 204.

As stated herein before, the stall detector 220 may receive the movement data and/or part thereof from one or more of the sensors 254 deployed and adapted to measure one or more of the motion parameters, operational parameters and/or a combination thereof. In another example, the stall detector 220 may receive the movement data and/or part thereof from one or more of the controller(s) 252 which control, and/or in communication with one or more components of the pool equipment unit 202, for example, a sensor 254, an electric motor 250, and/or the like.

In particular, the movement data received by the stall detector 220 may comprise movement parameters relating to, reflecting and/or expressing, movement of the pool equipment unit 202 during one or more sampling windows. The duration (period, interval) of the sampling window, for example, 0.5 seconds, 1 second, 2 seconds, 3 seconds, 5 seconds, and/or the like may be predefined and/or dynamically adjusted in real-time according to one or more rules, conditions, restrictions, and/or the like.

For example, the sampling window period may be predefined and/or adjusted according to one or more attributes, and/or characteristics of the water pool 204, for example, a slipperiness of surfaces in the water pool 204, a texture of the surfaces in the pool 204, potential obstacles and/or objects located in the water pool 204, water conditions, and/or the like. In another example, the sampling window period may be predefined and/or adjusted according to one or more operational attributes of the pool equipment unit 202, for example, a weight, type of advancing means (movement technology), sampling capability of the sensor(s) 254 (e.g., sampling rate, sampling accuracy, etc.), and/or the like.

As shown at 104, the stall detector 220 may extract from the movement data, i.e., from the movement parameters, one or more motion features expressing movement of the pool equipment unit 202 during the sampling window, for example, angular velocity, acceleration, velocity, orientation, heading angle, elevation, and/or the like.

As shown at 106, the stall detector 220 may extract from the movement data i.e., from the movement parameters, one or more operational features reflecting and/or relating to operation one or more of the electric motor(s) 250, and/or to power driven to one or more of the electric motor(s) 250 during the sampling window, for example, current, voltage, PWM, Revolutions Per Minute (RPM), and/or the like.

The motion features and the operational features relating to movement of the pool equipment unit 202 are collectively designated movement features, meaning the movement features may comprise one or more motion features and/or one or more operational features of the pool equipment unit 202.

As shown at 108, the stall detector 220 may determine a movement pattern of the pool equipment unit 202 based on analysis of one or more of the movement features, i.e., the motion feature(s) and/or the operational feature(s). Specifically, the stall detector 220 may analyze the movement feature(s) to determine whether the movement pattern of the pool equipment unit 202 is a stalled state, i.e., whether the pool equipment unit 202 is in the stalled state.

In the stalled state, the pool equipment unit 202 may be in a pitched up position and unable to advance on a slopped obstacle in the water pool 204, for example, a wall, a slopped floor surface, an object located in water pool 204 (e.g., pool accessory, maintenance equipment, etc.), and/or the like. In other words, in the stalled state, the pool equipment unit 202 may be stuck in place and unable to move in the intended direction.

For example, assuming the pool equipment unit 202 is moving forward and hits a wall of the water pool 204 which it is unable to climb. In such case, the front side of the pool equipment unit 202 may rise at least slightly but the pool equipment unit 202 may be stuck and unable to advance (move) forward. In another example, assuming the pool equipment unit 202 is moving backward and hits a steep slopped surface on the floor of the of the water pool 204 and is unable to climb it. In such case, the rear side of the pool equipment unit 202 may rise at least slightly but the pool equipment unit 202 may be stuck and unable to advance (move) backward.

However, while in the stalled state, the pool equipment unit 202 may continue attempting to advance in the current direction even when making no actual movement. This means that the electric motor(s) 250 may be still operated, for example, by the controller(s) 252, to drive the advancing means in attempt to move the pool equipment unit 202 in the current direction. The stalled state, i.e., the continued attempt to move in the current direction while stuck, may be therefore regarded as digging since the pool equipment unit 202 may seem to dig into the slopped obstacle.

The stall detector 220 may determine the movement pattern of the pool equipment unit 202 using one or more statistical models trained to estimate, and/or predict the movement pattern of the pool equipment unit 202 based on one or more of the movement features. Specifically, the statistical models may be trained to classify the movement pattern of the pool equipment unit to normal movement and to the stalled state based on the movement features.

Statistical models, as known in the art, may express a mathematical representation of a real-world system, phenomenon, scenario, and/or the like. The trained statistical model may use one or more statistical methods to describe and predict the behavior of the system based on collected/trained data. The statistical model(s) includes parameters that may be estimated or estimated from data, and it is used to generate hypotheses or make inferences about the system with the goal of understanding the relationships between variables and make accurate predictions based on the data.

In particular, the statistical model(s) used by the stall detector 220 may be adapted and trained to predict and classify accordingly movement patterns of the pool equipment unit 202 based on values of the movement features, i.e., the motion features and/or the operational features and/or their relations with each other. The statistical model(s) may be adapted and trained to classify the movement pattern of the pool equipment unit 202 to a plurality of classes, for example, two classes, namely normal movement and the stalled state.

For example, the statistical model(s) may be trained to determine the stalled state based on the head angle of the pool equipment unit 202 which, as described herein before, may be indicative that the pool equipment unit 202 is stuck and unable to climb a wall, and/or another object in the water pool 204. In another example, due to its inability to move while its motor(s) is running, the pool equipment unit 202 may experience increased rattling, bouncing, shaking and/or the like which may be learned by the statistical model(s) as characteristic to the stalled state.

The statistical methods used by the statistical model(s) may comprise, for example, Linear Discriminant Analysis (LDA), Analysis of variance (ANOVA), regression analysis, and/or the like. An LDA based statistical model may be trained, as known in the art, to compute, adjust and determine coefficient values of the model which may optimally separates n classes according to a certain set of features provided to the model as input.

Optionally, the statistical model(s) used by the stall detector 220 to determine the stalled state of the pool equipment unit 202 may comprise one or more Machine Learning (ML) models, for example, a neural network, a Support Vector Machine (SVM), a classifier, and/or the like trained to classify the movement pattern of the pool equipment unit 202 based on captured motion features and/or operational features relating to movement of the pool equipment unit 202.

The statistical model(s) may be trained in one or more supervised learning training sessions using a plurality of labeled training samples each comprising one or more of the plurality of movement features relating to one or more dynamic pool equipment units and labeled (associated) accordingly with a label indicative of the movement pattern at the time of capturing the movement features.

The labeled training samples may include training samples reflecting one or more normal movement patterns (normal movement) of the pool equipment unit 202 while the pool equipment unit 202 is not in the stalled state, for example, forward movement, backward movement, upward movement, sideways movement, rotation, and/or the like and training samples reflecting the stalled state in which one or more pool equipment units 202 are in the stalled state.

Each of the training samples may be labeled accordingly to indicate whether the respective training sample reflects the stalled state or normal movement.

One or more of the training samples may comprise real-world movement features recorded during operation of one or more pool equipment unit such as the pool equipment unit 202 and labeled accordingly to reflect the movement pattern of the respective pool equipment unit 202 during the recordation of the movement features. Additionally and/or alternatively, one or more of the training samples may comprise synthetic movement features generated using one or more methods based on real-world parameters, for example, simulation, extrapolation, interpolation and/or the like.

Optionally, the statistical models may comprise one or more first statistical models adapted and trained accordingly to determine, estimate, and/or predict the stalled state movement pattern of the pool equipment unit 202 during forward movement, more accurately during attempted forward movement, and one or more second statistical models adapted and trained accordingly to determine, estimate, and/or predict the stalled state movement pattern of the pool equipment unit 202 during backward movement, specifically during attempted backward movement.

The statistical model(s) used by the stall detector 220 may compute an estimation score (prediction score) for the estimated movement pattern of the pool equipment unit 202. The estimation score may reflect a confidence, reliability, and/or accuracy level of the classification (prediction) computed by the statistical model(s). As such the statistical model(s) may compute an estimation score for the estimation (classification, prediction) that the pool equipment unit 202 is in the stalled state.

The estimation score may be in one or more predefined range, for example, 0-1, 0-100, (−1)−1, and/or the like, where the higher the value the higher the probability and/or confidence of the estimation, as known in the art.

As shown at 110, which is a conditional step, in case the stall detector 220 determine whether the pool equipment unit 202 is in the stalled state or not. For example, the stall detector 220 may compare between the estimation score computed by the statistical model(s) for the estimated stalled state and a certain classification threshold which may be predefined and/or dynamically adjusted in real-time.

The certain threshold may be set according to a required confidence level of the estimated movement pattern of the pool equipment unit 202, specifically a confidence level of the estimation that the pool equipment unit 202 is in the stalled state is correct. For example, assuming the estimation score range is 0-1, the certain threshold may be set to 0.85 to set a high confidence level while the certain threshold may be set to 0.65 to set a lower confidence level.

In case the movement pattern of the pool equipment unit 202 is estimated to be the stalled state, i.e., the estimation score exceeds the certain threshold, the stall detector 220 may determine that the pool equipment unit 202 is in the stalled state, and the process 100 may branch to 114 or optionally to optional step 112 if applicable. Otherwise, since the movement pattern of pool equipment unit 202 is estimated to be normal movement rather than the stalled state, i.e., the estimation score does not exceed the certain threshold, the stall detector 220 may determine that the pool equipment unit 202 is not in the stalled state, and the process 100 may branch back to 102 to continue collecting movement features captured during another sampling window and monitor for future potential stalled states.

Optionally, as shown at 112, the stall detector 220 may initiate another estimation cycle (iteration) to determine whether the pool equipment unit 202 is in the stalled state based on additional movement features captured during an additional sampling window, specifically a consecutive sampling window.

As shown in 114, the stall detector 220 determines that the pool equipment unit 202 is in the stalled state. As described herein before, the stall detector 220 may determine that the pool equipment unit 202 is in the stalled state according to the estimation of the statistical model(s) made based on the movement features captured during a single sampling window.

Optionally, in case step 112 is applied and the statistical model(s) estimate the stalled state based on movement features captured during a plurality of consecutive sampling window, the stall detector 220 determines that the pool equipment unit 202 is in the stalled state based on aggregation, for example, sum, average, normalization, and/or the like of a plurality of estimations computed by the statistical model(s) based on a plurality of movement samples sets captured during the plurality of consecutive sampling windows. Aggregating the plurality of estimations and determining the stalled state accordingly may increase confidence, certainty, and/or accuracy of the estimation made by the statistical model(s) that the pool equipment unit 202 is in the stalled state since the aggregation may reduce and possibly eliminate, outliers and/or marginal estimations.

Optionally, the stall detector 220 may determining (decide) that the pool equipment unit 202 is in the stalled state responsive to detecting that the stalled state exceeds a predefine time period (timeout), for example, 3 seconds, 4 seconds, 5 seconds, 10 seconds, and/or the like. This means that the stall detector 220 may collect movement data measured during the predefine time period and after determining that the pool equipment unit 202 is in the stalled state for a period of time that exceeds (i.e., longer than) the predefined time period, the stall detector 220 may determining and/or conclude that the pool equipment unit 202 is in the stalled state.

The stall detector 220 may apply one or more methods to detect and/or determine that the pool equipment unit 202 is in the stalled state for a time period exceeding the predefined time period. For example, the stall detector 220 may aggregate a plurality of estimations of the statistical model(s) that the pool equipment unit 202 is in the stalled state based on movement data samples captured in a plurality of consecutive sampling windows exceeding the desired timeout period. In another example, the stall detector 220 may adjust the time period of the sampling window to equal or exceed the predefined time period.

As shown at 116, responsive to determination that the pool equipment unit 202 is in the stalled state, the stall detector 220 may take and/or initiate one or more actions.

For example, the actions initiated by the stall detector 220 may comprise causing the pool equipment unit 202 to stop the attempted advance in a current direction, i.e., stop trying to move in the current direction since the pool equipment unit 202 is stalled and unable to advance. The stall detector 220 may apply one or more methods and/or operations to cause the pool equipment unit 202 to stop the attempted advance, typically based on the deployment of the stall detector 220.

For example, assuming the stall detector 220 is executed by one or more of the controller(s) 252 which control operation of the pool equipment unit 202 including its movement direction, speed, and/or the like. In such case, the controller(s) 252 executing the stall detector 220 may identify the stalled state and operate one or more mechanisms of the pool equipment unit 202, for example, a steering system, an electric motor 250, and/or the like to stop change direction and/or the like.

In another example, in case the stall detection system 200 is independent of the controller(s) 252 controlling the operation of the pool equipment unit 202, the actions initiated by the stall detector 220 may comprise transmitting one or more messages to the controller(s) 252 to inform the controller(s) 252 of the stalled state and stop the attempted advance in a current direction.

Optionally, the stall detector 220 may initiate one or more additional actions responsive to determining that the pool equipment unit 202 is in the stalled state. For example, the stall detector 220 may induce movement of the pool equipment unit 202 in a different direction by directly controlling the pool equipment unit 202, if executed by the controller(s) 252, and/or by informing the controller(s) 252 to change the advancement direction, in case the stall detection system 200 is independent of the controller(s) 252. In another example, the stall detector 220 may transmit one or more warning messages to one or more remote devices, for example, a control center, a maintenance system, a person, a user, and/or the like to inform of the stalled state.

Optionally, the stall detector 220 may not stop the pool equipment unit 202 from trying to move in the current direction even when the pool equipment unit 202 is determined to be in the stalled state and unable to advance. Rather, the stall detector 220 may permit the pool equipment unit 202 to persist in the stall state without stopping it. This may be done, for example, for a pool cleaning robot 202 in order to improve cleaning of the location in which the robot 202 is stalled, for example, the corner section between a wall surface and a floor surface in the water pool 204.

Figure 3:
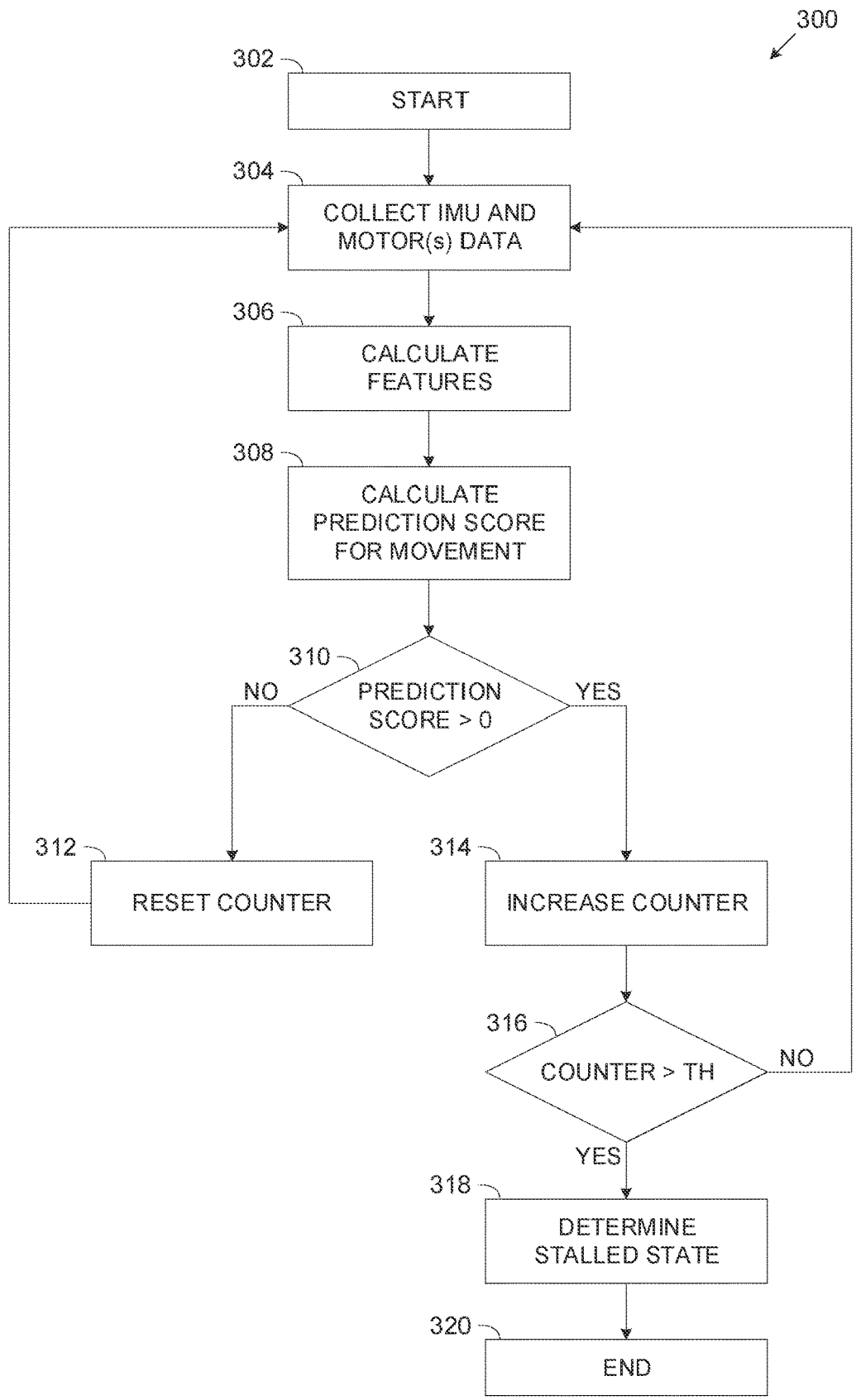
FIG. 3 is a flowchart of an exemplary sequence for detecting a stalled state of a dynamic pool equipment unit deployed in a water pool, according to some embodiments of the present invention.

Reference is now made to FIG. 3, which is a flowchart of an exemplary sequence for detecting a stalled state of a dynamic pool equipment unit deployed in a water pool, according to some embodiments of the present invention.

An exemplary sequence 300 follows a process such as the process 100, executed by a stall detector such as the stall detector 220 for detecting a stalled state of a pool equipment unit such as the pool equipment unit 202.

In particular, the sequence 300 describes a multi-cycle classification process in which the movement pattern of the pool equipment unit 202, specially the stalled state is determined based on a plurality of estimation (classification) cycles (iterations) are conducted using movement parameters captured during multiple consecutive sampling windows. The number of consecutive classification cycles in which the pool equipment unit 202 is determined to be in the stalled state may be predefined and/or adjusted in real-time and may be recorded in a counter.

As shown at 302 and 304, the stall detector 220 may collect movement data, for example, IMU data, indicative of movement of the pool equipment unit 202 and motor data indicative of operation of one or more electric motors such as the electric motor 250 of the pool equipment unit 202.

In particular, the stall detector 220 may collect movement data captured and/or measured during a sampling window. For example, the stall detector 220 may accumulate the movement parameters and sore them in a buffer and move to step 306 when the buffer is full. The sampling rate coupled with the size of the buffer, i.e., the number of samples stored in the buffer may define the time period of the sampling window.

As shown at 306, the stall detector 220 may calculate, compute, and/or extract movement features, for example, motion features and/or operational features based on the collected IMU data and motor data respectively.

As shown at 308, the stall detector 220 may calculate an estimation (prediction) score, i.e., apply a trained statistical model to estimate (predict) movement pattern (class) of the pool equipment unit 202 based on the calculated movement features. Specifically, the stall detector 220 may predict whether the pool equipment unit 202 is in the stalled state or in normal movement and compute the prediction score accordingly.

For example, the based statistical model may be trained to classify the movement pattern of the pool equipment unit 202 into one of two classes, normal movement and the stalled state, based on the calculated movement features and compute the prediction score accordingly. A classification threshold may be set to separate the two classes. The classification score may be set, defined and/or selected according to one or more parameters and/or attributes, for example, defined classes, selected statistical model(s) and/or the like. For example, since there are only two classes the classification threshold may be set to '0'. As such, if the prediction score computed based on the calculated movement features is larger than (exceeds) '0' the movement pattern is estimated to be the stalled state. However, in case the prediction score is smaller than (does not exceed) '0' the movement pattern is estimated to be normal movement.

As shown at 310, which is a conditional step, in case the prediction score exceeds the classification threshold, for example, prediction score >'0', the stall detector 220 may determine that the pool equipment unit 202 is in the stalled state and the sequence may proceed to 314. However, in case the prediction score does not exceed the classification threshold, for example, prediction score <'0', the stall detector 220 may determine that the pool equipment unit 202 is not in the stalled state may branch to 312.

As shown at 312, since it determines that the pool equipment unit 202 is not in the stalled state, the stall detector 220 may reset the counter recording the number of preceding estimation cycles in which the computed prediction score exceeded the classification threshold, e.g., prediction score >'0'. The stall detector 220 may further reset, clear, and/or discard the contents of the buffer storing the collected movement parameters.

The stall detector 220 may then proceed back to step 304 to start over and collect movement parameters during a subsequent sampling window in order to determine the movement pattern of the pool equipment unit 202, specifically whether the pool equipment unit 202 is in the stalled state or not.

As shown at 314, the stall detector 220 may increase (increment) the counter recording the number of consecutive estimation cycles in which the computed prediction score exceeded the classification threshold, e.g., prediction score >'0'.

As shown at 316, which is also a conditional step, in case the value of the counter (i.e., number of cycles) exceeds a certain cycles (iterations) threshold (TH), the stall detector 220 may proceed to 316. Otherwise, since the number of cycles does not exceed the iterations TH, the stall detector 220 may proceed back to step 304 to initiate another estimation cycle in which the movement pattern of the pool equipment unit 202 may be estimated based on movement parameters collected during a subsequent sampling window.

As shown at 318, since the number of consecutive estimation cycles in which the computed prediction score >'0', exceeds the cycles threshold, the stall detector 220 may determine that the pool equipment unit 202 is in the stalled state and may proceed to 320 to end the process 300.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms pool equipment unit, and electric motor are intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of detecting stalled state of a dynamic pool equipment unit, comprising:
using at least one processor for:
receiving a plurality of movement features relating to a dynamic pool equipment unit deployed in a water pool, the plurality of movement features, captured during a predefined sampling window, comprise at least one motion feature of the pool equipment unit and at least one operational feature of at least one electric motor of the pool equipment unit;
determining a movement pattern of the pool equipment unit using at least one statistical model applied to the plurality of movement features, the at least one statistical model is trained to estimate a stalled state of the pool equipment unit in which the pool equipment unit is pitched up and unable to advance on a slopped obstacle in the water pool;

causing the pool equipment unit to stop attempted advance in a current direction responsive to determining that the pool equipment unit is in the stalled state.

2. The computer implemented method of claim 1, wherein the stalled state is determined based on a comparison between an estimation score computed by the at least one statistical model for the estimated stalled state and a certain threshold.

3. The computer implemented method of claim 1, wherein the at least one statistical model is trained to classify the movement pattern of the pool equipment unit to normal movement and to the stalled state based on the plurality of movement features.

4. The computer implemented method of claim 1, further comprising determining that the pool equipment unit is in the stalled state based on aggregation of a plurality of estimations computed by the at least one statistical model based on a plurality of movement samples sets captured during a plurality of consecutive sampling windows.

5. The computer implemented method of claim 1, further comprising determining that the pool equipment unit is in the stalled state responsive to detecting the stalled state exceeds a predefine time period.

6. The computer implemented method of claim 1, further comprising permitting the pool equipment unit to persist in the stall state without stopping it.

7. The computer implemented method of claim 1, further comprising using at least one first statistical model trained to estimate the stalled state during forward movement and at least one second statistical model trained to estimate the stalled state during backward movement.

8. The computer implemented method of claim 1, wherein the at least one statistical model is trained in at least one supervised learning training session using a plurality of labeled training samples, each of the plurality of labeled training samples comprises at least one of the plurality of movement features and is associated with a label indicative of movement of the pool equipment unit at a time of capturing the at least one movement feature of the respective training sample.

9. The computer implemented method of claim 1, wherein the at least one statistical model is based on linear discriminant analysis (LDA).

10. The computer implemented method of claim 1, wherein the at least one statistical model comprises at least one machine learning (ML) model.

11. The computer implemented method of claim 1, wherein the at least one motion feature is selected from a group consisting of: an acceleration, an angular velocity, a velocity, and an orientation.

12. The computer implemented method of claim 1, wherein the at least one motion feature is captured by at least one sensor deployed to measure motion parameters of the pool equipment unit.

13. The computer implemented method of claim 1, wherein the at least one operational feature is selected from a group consisting of: a pulse width modulation (PWM), a current, a voltage, and a power driven to the at least one electric motor.

14. The computer implemented method of claim 1, wherein the at least one operational feature is measured by at least one sensor deployed to measure operational parameters of the at least one electric motor.

15. The computer implemented method of claim 1, wherein the at least one operational feature is reported by at least one controller of the at least one electric motor.

16. The computer implemented method of claim 1, further comprising initiating at least one action responsive to determining the pool equipment unit is in the stalled state, the at least one action comprising, inducing movement of the pool equipment unit is a different direction, and transmitting at least one warning message to at least one remote device.

17. The computer implemented method of claim 1, wherein the at least one electric motor operates advancing means of the pool equipment unit configured to advance the pool equipment unit.

18. A system for detecting stalled state of a dynamic pool equipment unit, comprising:

a program store storing a code; and at least one processor coupled to the program store, the at least one processor is configured to execute the code, the code comprising:

code instructions to receive a plurality of movement features relating to a dynamic pool equipment unit deployed in a water pool, the plurality of movement features, captured during a predefined sampling window, comprise at least one motion feature of the pool equipment unit and at least one operational feature of at least one electric motor of the pool equipment unit;

code instructions to determine a movement pattern of the pool equipment unit using at least one statistical model applied to the plurality of movement features, the at least one statistical model is trained to estimate a stalled state of the pool equipment unit in which the pool equipment unit is pitched up and unable to advance on a slopped obstacle in the water pool; and code instructions to cause the pool equipment unit to stop attempted advance in a current direction responsive to determining that the pool equipment unit is in the stalled state.

* * * * *